Figure 14:
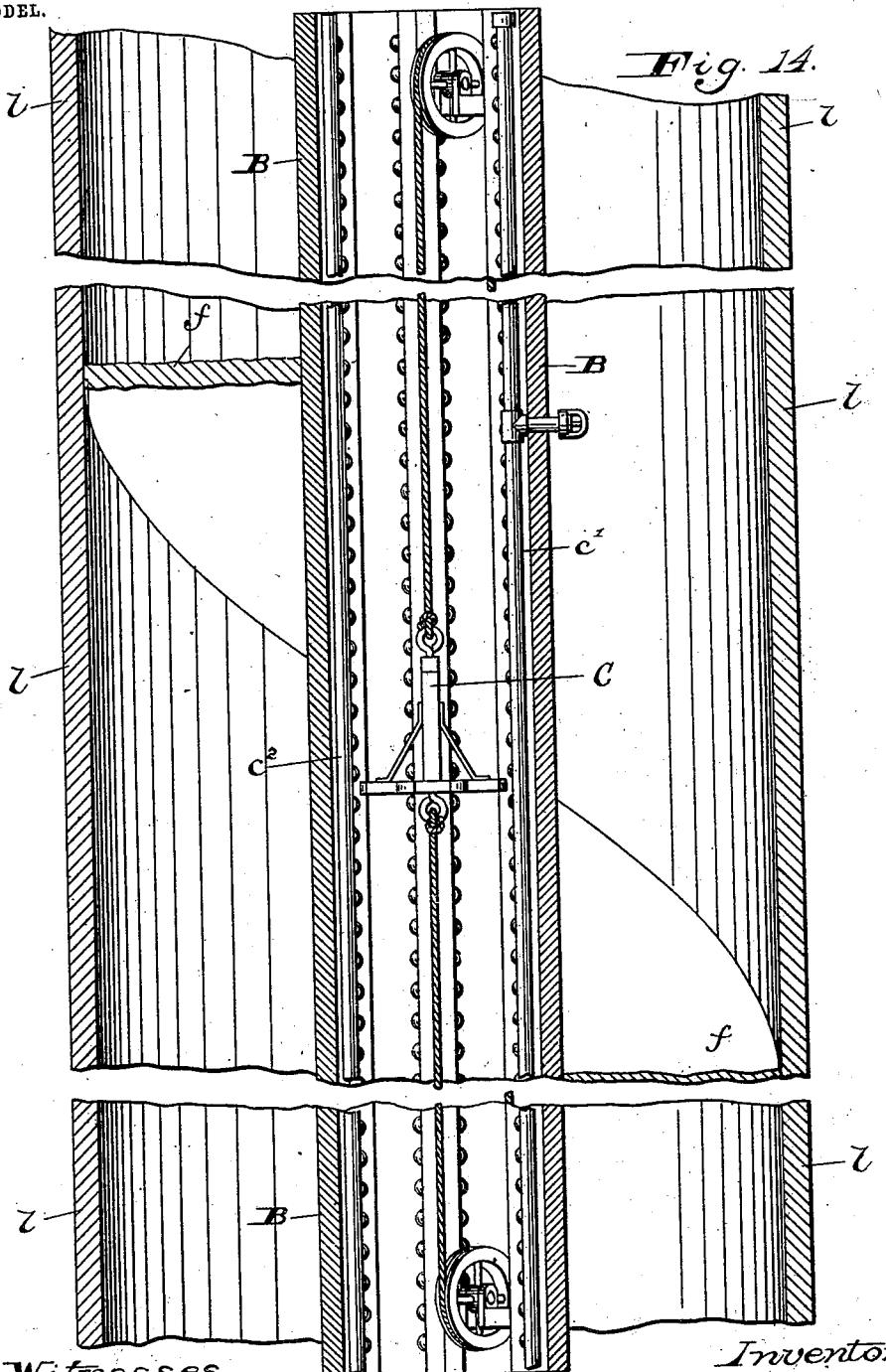

No. 728,626. PATENTED MAY 19, 1903.
M. C. SCHWAB.
CONVEYER.
APPLICATION FILED JAN. 5, 1903.
NO MODEL. 5 SHEETS—SHEET 1.
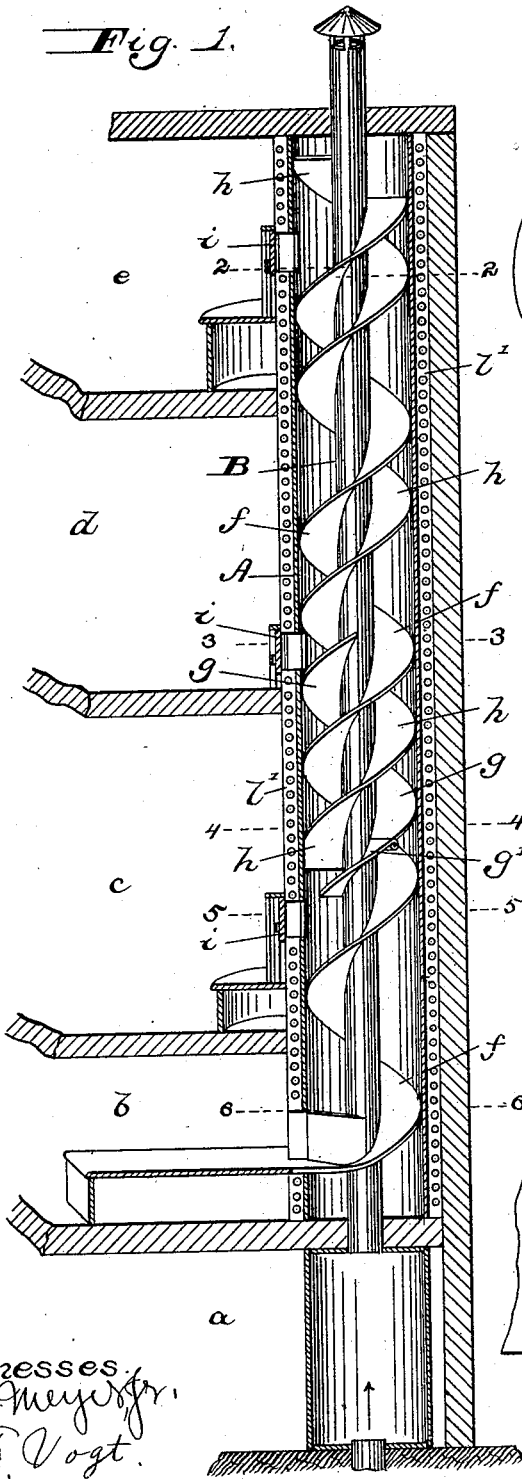
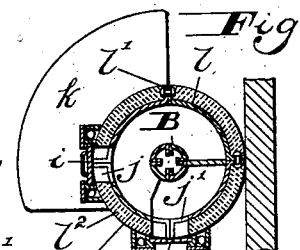
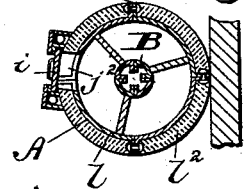
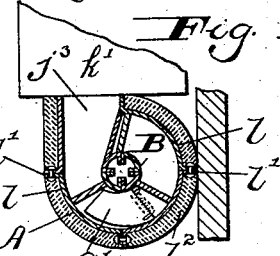
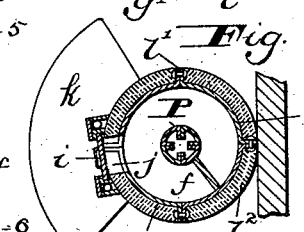
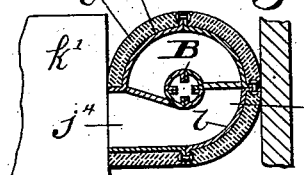
Witnesses
H. J. Meyer Jr.
G. F. Vogt.
Inventor.
Martin C. Schwab
By Mann & Co.
Attorneys.

No. 728,626. PATENTED MAY 19, 1903.
M. C. SCHWAB.
CONVEYER.
APPLICATION FILED JAN. 5, 1903.
NO MODEL. 5 SHEETS—SHEET 2.
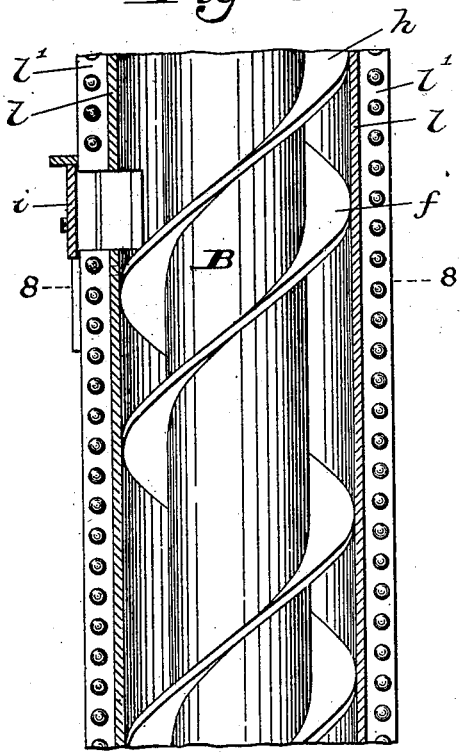
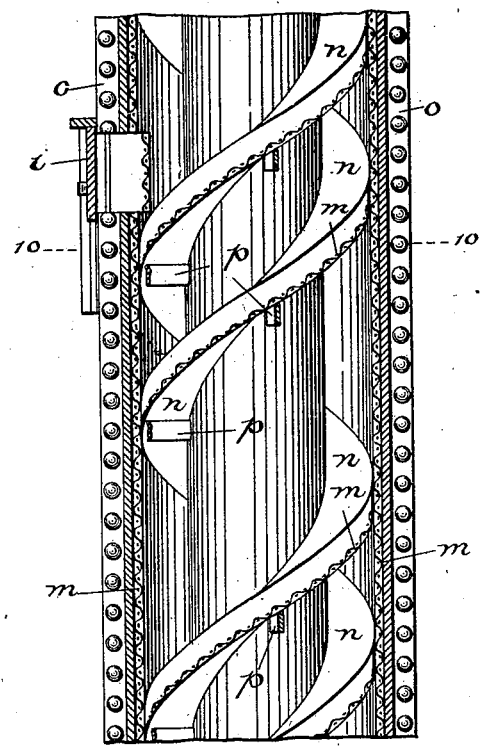
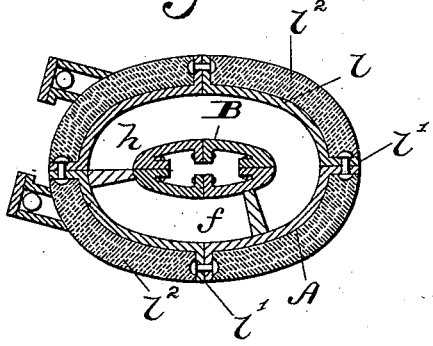
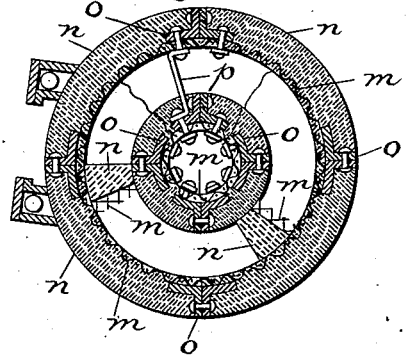
Witnesses
H. F. Meyer Jr.
G. F. Vogt.
Inventor
Martin C. Schwab
By Mann & Co,
Attorneys.

No. 728,626. PATENTED MAY 19, 1903.
M. C. SCHWAB.
CONVEYER.
APPLICATION FILED JAN. 5, 1903.
NO MODEL. 5 SHEETS—SHEET 3.
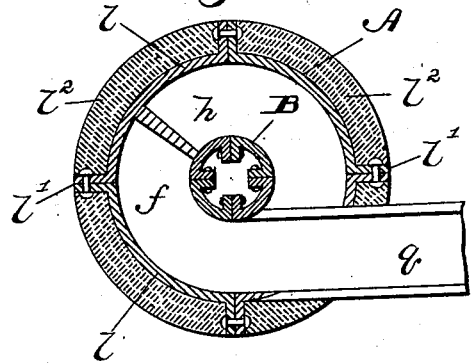
Fig. 12.
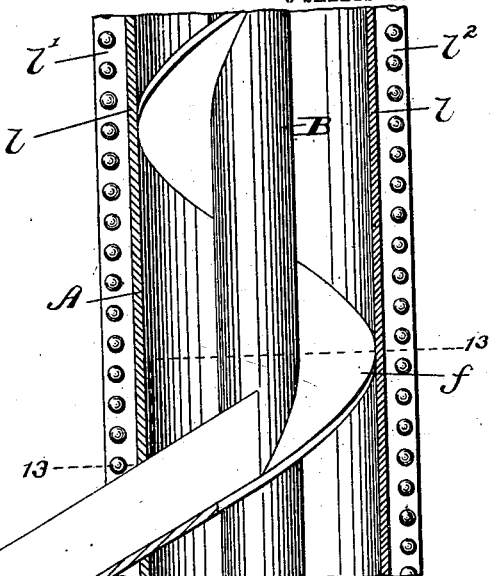
Fig. 11.
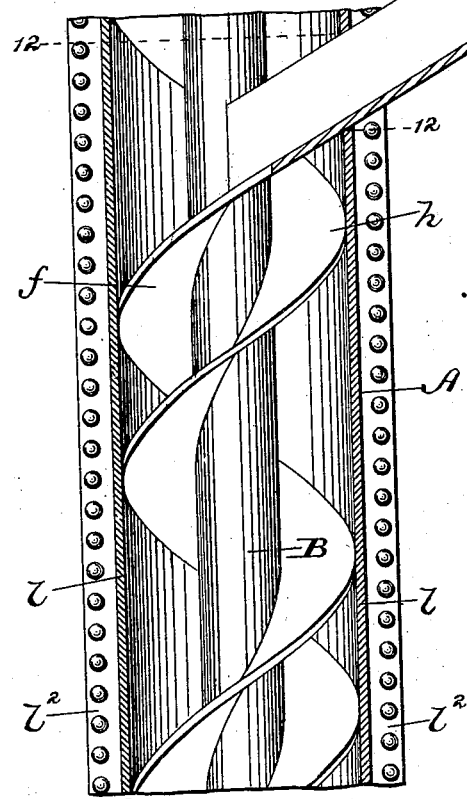
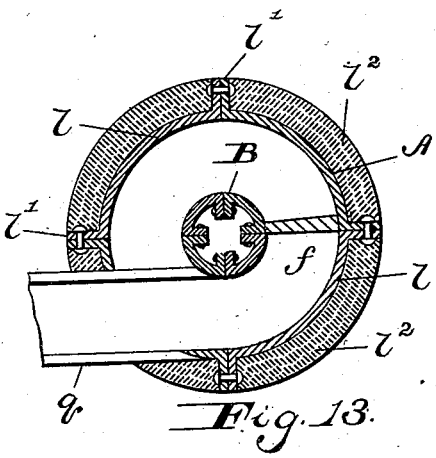
Fig. 13.
Witnesses:
H. F. Meyer Jr.
G. F. Vogt.
Inventor.
Martin C. Schwab
By Mann & Co.
Attorneys.

No. 728,626. PATENTED MAY 19, 1903.
M. C. SCHWAB.
CONVEYER.
APPLICATION FILED JAN. 5, 1903.
NO MODEL. 5 SHEETS—SHEET 4.

Witnesses
H. J. Meyer Jr.
G. F. Vogt.

Inventor.
Martin C. Schwab
By Mann & Co.
Attorneys.

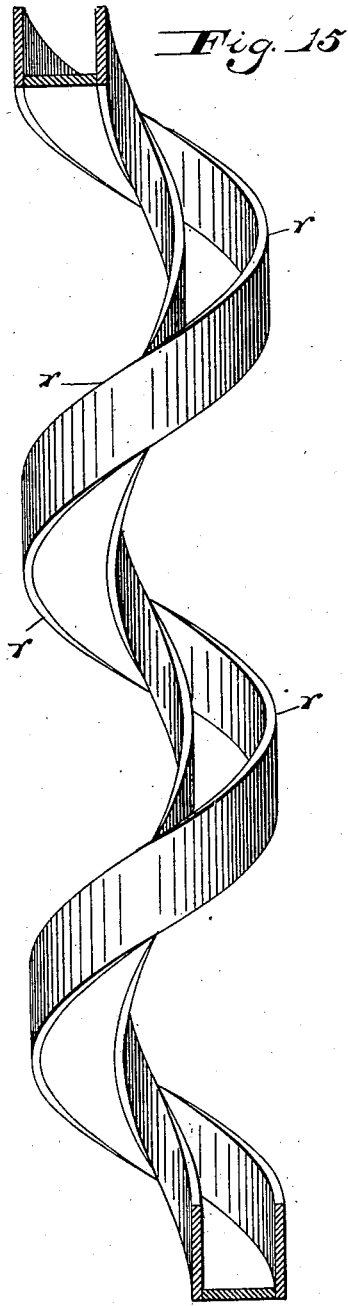

No. 728,626.

Patented May 19, 1903.

UNITED STATES PATENT OFFICE.

MARTIN C. SCHWAB, OF BALTIMORE, MARYLAND.

CONVEYER.

SPECIFICATION forming part of Letters Patent No. 728,626, dated May 19, 1903.

Application filed January 5, 1903. Serial No. 137,798. (No model.)

*To all whom it may concern:*

Be it known that I, MARTIN C. SCHWAB, a citizen of the United States, residing at Baltimore, State of Maryland, have invented certain new and useful Improvements in Conveyers, of which the following is a specification.

This invention relates to certain improvements in conveyers especially adapted for use in department and other stores for transmitting packages from the various floors to the shipping-room or from one floor to another.

The object of the invention is to provide improvements in this class of conveyers such as is described and illustrated in the specification annexed to Letters Patent of the United States, No. 702,115, granted to me June 10, 1902, said improvements being hereinafter set forth and their novel features being particularly pointed out in the appended claims.

Reference is to be had to the accompanying drawings, in which—

Figure 1 is a vertical sectional view of one form of the improved conveyer. Figs. 2 to 6, inclusive, are horizontal sectional views taken approximately on the lines 2 2, 3 3, 4 4, 5 5, and 6 6, respectively, of Fig. 1. Fig. 7 is a vertical sectional view of a conveyer elliptical in cross-section. Fig. 8 is a horizontal section taken approximately on the line 8 8 of Fig. 7. Fig. 9 is a vertical transverse sectional view of a conveyer embodying certain modifications in its construction. Fig. 10 is a horizontal section taken approximately on the line 10 10 of Fig. 9. Fig. 11 is a vertical sectional view illustrating another modification. Figs. 12 and 13 are horizontal sectional views, respectively, on the lines 12 12 and 13 13 of Fig. 11. Fig. 14 is a vertical sectional view on a much larger scale than the preceding figures and illustrates another modification. Fig. 15 illustrates another modification.

In Figs. 1 to 6, inclusive, of the accompanying drawings the invention is illustrated as installed in a department-store or other similar building which is provided with a cellar $a$, a basement $b$, which in this instance represents the shipping-room, and three floors $c$, $d$, and $e$, although it is to be understood that such number is merely representative, as there may be any reasonable number of floors. In the said building and at a suitable location therein consistent with the structural features and architectural plan of the building is my improved conveyer, which in the form illustrated in said figures comprises a cylindrical or tubular vertical shaft A, a tubular core B within said shaft, and spiral chutes (hereinafter referred to and designated by reference-letters) secured to the exterior of the core and of sufficient width to contact with the interior wall of the shaft. This conveyer extends, preferably, the entire height of the building, from the top floor to the basement, which latter is usually the shipping room or department. As shown in Fig. 1, there is a spiral chute $f$, extending from the top floor uninterruptedly to the shipping-room and which I therefore call the "main" chute. There is also a chute $g$, extending from one floor (in this instance floor $d$) to a floor below and provided with a downwardly-yielding hinged leaf $g'$, adapted to be depressed by the weight of a package to deposit the package without jar upon the main chute $f$, so that I call such chute $g$ an "auxiliary" chute, and there is also a chute $h$, extending from one floor (in this instance the top floor $e$) to some lower floor, where it discharges its load, and I therefore call said chute $h$ a "local" chute. Feed and discharge openings are formed in the shaft A at appropriate points for the deposition of packages on the several chutes before named, and said openings are provided with suitable doors $i$, preferably counterweighted, so as to be self-closing. For instance, as illustrated in Fig. 2, there are two feed-openings $j$ $j'$ on the top floor, one opening being for the main chute $f$ and the other for the local chute $h$. As illustrated in Figs. 3 and 5, there is a feed-opening $j^2$ on the floor $d$ for the auxiliary chute $g$ and another feed-opening $j$ on the floor $c$ for the main chute $f$, and, as illustrated in Figs. 4 and 6, there is also on the floor $c$ a discharge-opening $j^3$ for the local chute and in the basement $b$ a discharge-opening $j^4$ for the main chute. Before any desired feed-opening is located a platform $k$, and a delivery-table $k'$ is located contiguous to each discharge-opening.

In the construction of the conveyer illustrated in Figs. 1 to 6, inclusive, the tubular shaft A is made in a number of sections $l$, with outwardly-extending flanges $l'$ bolted or riveted together and inclosed in a plaster or other jacket $l^2$, and the tubular core B is also made in a number of sections, secured together by bolts or the like. The said core B may serve as exhaust-pipe for the blast of a pneumatic-carrier system for change and the like, as illustrated in Fig. 1, or it may serve for other purposes. For instance, as indicated in Fig. 14, a package-elevator or dumb-waiter C may be rigged up within the said core, and the latter may also contain a stand-pipe $c'$ for thermostats and automatic fire-extinguishers and also a pipe or conduit $c^2$ for electric-light or other wires.

While the tubular shaft and core are shown circular in cross-section in Figs. 1 to 6, it is to be understood that they are not limited thereto. For instance, the structure of the building in which it is designed to install one of my conveyers may be such as to necessitate some other form—as, for instance, the elliptical forms illustrated in Figs. 7 and 8.

While the tubular shaft, the core, and the spiral chute may all be made entirely of metal, they may also be made, as illustrated in Figs. 9 and 10, of stiff woven wire $m$, embedded in some fireproof plaster $n$, such as asbestolith, and reinforced by angle-irons $o$. In this construction the spiral chutes are preferably supported in place by means of cross-bars $p$, extending from the reinforcing angle-iron of the core to the corresponding angle-iron of the tubular shaft.

The structural plan of some buildings may also prevent straightaway conveyers, such as hereinbefore referred to, from the top floor to the basement. In such event and for other reasons also I provide, as illustrated in Figs. 11, 12, and 13, two conveyers, one of whose spiral chutes is connected at any desired point with the chute of the other conveyer by means a chute $q$, which may be straight or curved to get around some obstruction in the building.

The conveyer may also be provided, as illustrated in Fig. 15, with a spiral chute of trough design with two side walls $r$, which take the place, and in one respect are the equivalents, of the tubular core B and cylinder A. This trough-chute may be supported in the building in any desired manner.

In describing the operation of my improved conveyer let it be supposed that the building in which it is installed is a large department-store handling, among other things, millinery. In such an instance the top floor $e$ may be a room in which the furnishings of a hat are selected and the first floor $c$ may be the room in which the hats are trimmed. When a person has selected goods on the top floor, the goods may be put on the local chute $h$, whence they will be conveyed by gravity down to the trimming-room. This is merely cited to show one instance of the use of the local chute. The main chute $f$ is of course most often used for the purpose of sending packages from any floor to the shipping-room in the basement; but it might sometimes happen that on one floor—say the floor $d$—it is impossible to get goods or packages conveniently on the chute at that point. Hence I have provided the auxiliary chute $g$, which leads from said floor to a point below it, whence it connects, by means of the downwardly-yielding leaf $g'$, with the main chute.

Among the advantages of my improved conveyer not hereinbefore described may be cited the following: The conveyer requires no power for operation and has no moving parts, thereby eliminating all danger to operators when in the act of putting packages on the chute. It is always ready for use and has practically unlimited capacity, because the operators do not have to wait for the arrival of a descending platform or the like, thereby saving time. The design of the chute is such that it will successfully act as a fire-damper and does not possess the fire hazards which are found in other types of package-conveyers, and, as before described, it may be constructed as a duplicate or multiple spiral conveyer within the same space allotted for a single spiral and for convenient access to and from other floors.

It is to be understood that the pitch of the spiral chutes is to be developed according to the requirements in each particular case, usually according to the character of packages to be conveyed thereon.

Having thus described my invention, what I claim as new, and desire to secure by Letters Patent, is—

1. A conveyer for transmitting packages from a floor or floors of a building to other floors, comprising a tubular shaft; a main spiral chute in said shaft extending approximately the length thereof; a local spiral chute in said shaft shorter than said first-named chute and adapted to lead from one floor to another; and feed and discharge openings in said shaft for the packages, said openings registering with said chutes, as set forth.

2. A conveyer for transmitting packages and the like from the floors of a building to the shipping-room and from a floor to a floor beneath, comprising a tubular shaft; a main spiral chute in said shaft continuous from the top to the bottom of the same and adapted to convey packages from the top floor and other floors to the shipping-room and provided at its bottom with a discharge-opening; feed-openings in the shaft at various elevations by which packages may be placed on said chute at the various floors; a local chute shorter than said main chute and adapted to lead from a floor to a floor beneath; and a feed-opening in said shaft for said local chute and a discharge-opening in said shaft at the bottom of the said local chute.

3. A conveyer for transmitting packages and the like from the floors of a building to the shipping-room and from a floor to a floor beneath, comprising a tubular shaft; a main spiral chute in said shaft continuous from the top to the bottom of the same and adapted to convey packages from the top floor and other floors to the shipping-room and provided at its bottom with a discharge-opening; feed-openings in the shaft at various elevations by which packages may be placed on said chute at the various floors; a local chute shorter than said main chute and adapted to lead from a floor to a floor beneath; a feed-opening in said shaft for said local chute and a discharge-opening in said shaft at the bottom of the said local chute; and an auxiliary spiral chute in said shaft adapted to convey packages and deliver them onto the main chute.

4. A conveyer for transmitting packages and the like from the floors of a building to the shipping-room and from a floor to a floor beneath, comprising a tubular shaft; a main spiral chute in said shaft continuous from the top to the bottom of the same and adapted to convey packages from the top floor and other floors to the shipping-room and provided at its bottom with a discharge-opening; feed-openings in the shaft at various elevations by which packages may be placed on said chute at the various floors; a local chute shorter than said main chute and adapted to lead from a floor to a floor beneath; a feed-opening in said shaft for said local chute and a discharge-opening in said shaft at the bottom of the said local chute; and an auxiliary spiral chute in said shaft adapted to convey packages and deliver them onto the main chute, and provided at its bottom with a yielding leaf adapted to drop by the weight of a package onto the main chute.

5. A conveyer for transmitting packages in a store or similar building, comprising a tubular shaft; a tubular core in said shaft adapted to serve as an air-blast exhaust and as a shaft for a dumb-waiter, stand-pipes, electric-light wires and the like; and a plurality of different-length spirals extending around said conveyer and each continuous throughout its length, as set forth.

6. A conveyer of the character described, comprising a tubular shaft; a tubular core in said shaft; and a plurality of different-length spiral chutes extending around said core and each continuous throughout its length; the said shaft, core and chutes being constructed of sections of woven wire embedded in fire-proof plaster, as set forth.

7. The combination of two conveyers provided with a plurality of spiral chutes; and a chute, $q$, connecting the spiral chute of one conveyer with a spiral chute of the other conveyer, as set forth.

In testimony whereof I affix my signature in the presence of two witnesses.

MARTIN C. SCHWAB.

Witnesses:
HENRY ADAMS,
HERMANN EISERT.